United States Patent
Savin

(10) Patent No.: US 9,012,553 B1
(45) Date of Patent: Apr. 21, 2015

(54) COATING COMPOSITIONS

(76) Inventor: Ronald R. Savin, Rancho Mirage, CA (US)

( * ) Notice: Subject to any disclaimer, the term of this patent is extended or adjusted under 35 U.S.C. 154(b) by 852 days.

(21) Appl. No.: 13/205,346

(22) Filed: Aug. 8, 2011

Related U.S. Application Data

(60) Provisional application No. 61/372,630, filed on Aug. 11, 2010.

(51) Int. Cl.
*C08K 3/22* (2006.01)
*C08L 27/00* (2006.01)
*C09D 117/00* (2006.01)

(52) U.S. Cl.
CPC .................................... *C09D 117/00* (2013.01)

(58) Field of Classification Search
CPC ....... C09D 117/00; C09D 127/12; C09D 5/08
USPC .......................................................... 524/432
See application file for complete search history.

(56) References Cited

U.S. PATENT DOCUMENTS

2009/0275677 A1* 11/2009 Savin ............................. 523/219

* cited by examiner

*Primary Examiner* — Hui Chin
(74) *Attorney, Agent, or Firm* — Ladas & Parry LLP

(57) ABSTRACT

Recycled rubber is cold vulcanized at reactive sites in recycled rubber that were not reacted during initial production of articles such as tires from rubber. The provides for improved coating compositions having good tensile strength and cure times Such cold vulcanization of recycled rubber is effected by use of reactive metal oxides which the oxidation number of the metal is one that is other than its most stable state and include cuprous oxide, manganese dioxide and hausmannite ($Mn_3O_4$). Less reactive oxides such as iron oxides, silicon oxides, aluminum oxides chromium oxide and titanium dioxide are less effective.

14 Claims, No Drawings

COATING COMPOSITIONS

The present application claims priority from provisional application 61/372,630 filed on Aug. 11, 2010, the contents of which are incorporated herein by reference

FIELD OF THE INVENTION

The present invention relates to improved ways of utilizing recycled rubber and to coating compositions utilizing such recycled rubber.

BACKGROUND OF THE INVENTION

Rubber dust has been recycled in various forms since the early 1990s. It has been used in coating compositions, for example by addition to asphalt or coal tar for use on asphalt and concrete surfaces. One example of such use has been in rubberized emulsion aggregate slurry (REAS) in which crumb rubber is blended into an asphalt emulsion. REAS has been used in resurfacing of roads. It has, however, proved to be difficult to utilize high percentages of recycled rubber in these compositions because of difficulties in applying compositions containing more than abut 10% recycled rubber to surfaces to be coated.

In my prior U.S. Pat. No. 5,252,632 I described a low cost coating composition comprising light weight hollow glass spheres and a conductive phase.

In my U.S. Pat. No. 7,304,100 I described production of a coating composition by mixing a cellulosic thickener with a latex and glass bubbles.

In my copending U.S. patent application Ser. No. 12/433,981 I describe an aqueous coating composition comprising a mixture of recycled rubber particles, and particles at least one of glass or plastic particles, graphite particles and fluorinated resin particles such as polytetrafluoroethytlene and a suspension agent or resin.

Rubber is typically vulcanized using sulfur. However, other vulcanization agents, including peroxides urethane cross linkers and metal oxides have also been used. In the early days of the rubber industry in the mid Nineteenth Century basic oxides such as zinc oxide and lead oxide were also used. Today, zinc oxide is often used as a cross-linking accelerator in combination with sulfur. US Patent Publication 2009/0215963 mentions the use of potassium permanganate followed by hydrogen peroxide to produce a vulcanized rubber with hydroxy groups on its surface from a recycled vulcanized rubber that has previously been treated with boiling acetone to remove plasticizers. The product obtained is intended to be surface-grafted to a vinyl polymer.

SUMMARY OF THE INVENTION

In its broadest aspect, the present invention provides new way of utilizing recycled rubber by effecting cold vulcanization of reactive sites in recycled rubber that were not reacted during initial production of articles such as tires from rubber. This method has use in providing for improved coating compositions having good tensile strength and cure times Such cold vulcanization of recycled rubber may be effected by use of reactive metal oxides Such reactive metal oxides are those in which the oxidation number of the metal is one that is other than its most stable state and include cuprous oxide, manganese dioxide and hausmannite ($Mn_3O_4$) I have, however, found that less reactive oxides such as iron oxides, silicon oxides, aluminum oxides chromium oxide and titanium dioxide are much less effective than those I note above. The reactive oxides effectively improved the crosslinking or polymerization of the unsaturated bonds not "vulcanized" or polymerized during the initial tire manufacture at ambient temperature, Typically I use a weight ratio of recycled rubber particles to reactive metal oxide of from 30:1 to 2:1, for example of from 10:1 to 3:1.

Compositions utilizing the present invention may if desired include other film forming materials such as acrylic resins. Other additional components may include zinc oxide, aluminum silicate and dispersing agents. They may also include graphite and/or a fluorinated resin such as polytetrafluoroethytlene and a suspension agent or resin. The compositions can be applied in the form of a latex and may, for example incorporate glass or plastic particles as described in my copending application Ser. No. 12/433,981, now published as Publication 2009-0275677, the contents of which are incorporated herein by reference.

Such compositions have good tensile strength and rapid cure properties and can be applied using conventional techniques. I have found that use of compositions of the present invention will provide a means for significantly improving the protection of the infrastructure as the reactive metal oxides specified above promote a more rapid cure over most substrates, asphalt, concrete, steel, and effectively cure at depositions from 10 to 500 mils within a relatively short cure time. Most conventional maintenance and industrial coatings are limited to 3-5 mils per application to avoid sagging surface cracking or slow cure time. In one embodiment the present invention provides a way to provide effective deep deposition of latex emulsions incorporating a high percentile 35 to 50% of recycled rubber granules providing effective deep depositions.

Compositions of the invention may be used for a variety of uses including caulks, patio, road, driveway or parking lot surfaces and for use on roofs or in swimming pools. In this context, I have found that coatings made from compositions according to the invention have good resistance to corrosive environments. The precise nature of the composition will depend upon the intended use. For example use of cuprous oxide as the reactive metal oxide may also impart ant-fouling properties to the composition and so render coatings prepared from a cuprous oxide-containing composition particularly suitable for coating vessel hulls, and structures that are positioned in contact with salt or other bodies of water, such as sea and river walls, piers, jetties and buoys.

DETAILED DESCRIPTION OF THE INVENTION

Admixing of the reactive metal oxide, with recycled crumb rubber particles may be effected in any convenient manner. Optionally when effecting such mixing a reactive zinc oxide will also be added. Conveniently such mixing will be effected in situ when forming a coating composition and the reactive metal oxide will be added to the composition.

One type of composition in which such reactive metal oxide may be incorporated is one that typically contains from 10-40% recycled rubber particles, 0-40% glass or plastic particles, 0-10% graphite and/or fluorinated resin, and from 10-50% of a film forming resin, such as an acrylic resin and from 4-10% of a reactive metal oxide, provided that in the event that there is less than 10% glass or plastic particles, there is at least 1% fluorinated resin. For certain applications, such compositions may additionally contain particles of fiber glass and specialty chemicals such as preservation chemicals, such as mildewicides, solubilizing agents, antifoam agents such as Byk 024, pigments such as $TiO_2$, red oxide and yellow and black oxides. Ethylene glycol may also be a useful component when applying the composition to hot or warm surfaces.

In other applications, it may be desirable to include electrically conductive particles, for example where the composition is to be used to effect electromagnetic induction shielding as when the composition is used to coat electronic components or as a primer on articles containing electronic equipment, including aircraft and land vehicles where hardening against electromagnetic interference may be desired. As noted above, graphite is commonly used in compositions according to the invention and may be useful in this role. If the composition is intended to be used for electromagnetic induction shielding, choice of a graphite having a high electrical conductivity may be desirable. Alternatively or additionally, silver-coated particles such as silver-coated glass particles or hollow glass or ceramic spheres or silver-coated copper or nickel particles may be included. Such silver-coated particles are available from Potters Industries Inc. of Malvern Pa. When present, such silver-coated particles may form from 5-16% of the composition, more typically 7-12% of the composition.

For many of the components for use in the present invention, it is desirable that they be present in particles sizes that are as small as commercially practicable. I have therefore indicated that for such materials, the particle size should be less than a specified value. This does not mean that there is no lower limit to the particle sizes that can be used for such materials. As particle sizes of materials become smaller, the difficulties in handling the materials increase and one skilled in the art will recognize the practical lower limits on the particle sizes of the material being used.

Recycled rubber particles for use in the compositions of the present invention may be of a particle size of from 10 to 300 U.S. mesh or even finer, up to 400 mesh, depending on the intended use. I have found that for applications in which my compositions are to be used as caulks or for coating of parking lots or the like, it is possible to use recycled rubber particles having a particle size of 10 to 20 mesh. A particle size of less than 30 mesh may, however, be preferred for some such applications depending on cost. Rubber particles having particle sizes of less than 80 mesh or less than 140 mesh may prove suitable in some applications. Recycled rubber particles of these sizes are available for example from simply pulverizing discarded rubber products such as worn tires, tennis balls and other rubber-containing materials. For more specialist applications, particles of a smaller particle size, below say 200 U.S. mesh, preferably 300 U.S. mesh or finer are preferred. Particles of these fine particle sizes are obtainable, for example by freezing recycled tires and other rubber products and then pulverizing them. For some applications a mixture of particles of different sizes may be appropriate. For example, I have found that for highway and parking lot use a mixture of particles of 10-20 mesh with those having a particle size of less than 30 or 40 mesh may be desirable.

Recycled rubber of the coarser particle sizes employed in the present invention is widely available from a variety of sources. The finer sized particles are available, for example as PolyDyne 80 and PolyDyne 140 from LeHigh Technologies of Tucker, Ga.

Glass or plastic particles for use in the compositions of the present invention are typically of a particle size of less than 100 U.S. mesh (149 microns) more preferably from 3 to 50 microns. Such glass particles may be solid or hollow. Conveniently, some or all of the particles may be obtained from crushed recycled glass or waste fiberglass. I have found that solid glass spheres of a mean particle size of 1 to 50 microns, more preferably 5 to 20 microns are useful in the compositions of the invention in situations where the color of the coating is not important. In cases where it is necessary or desirable to have a light colored appearance, hollow glass spheres of a similar size should be used. Mixtures of particles obtained from waste fiber glass and soda glass, including finely crushed glass, may be used if desired. Suitable glasses include Spheriglass® particles and Sphericell® hollow glass spheres obtainable from Potters Industries Inc of Valley Forge Pa. and recycled low alkali fiber glass particles obtainable from Vitro Minerals of Social Circle Ga. Particularly suitable glasses include Potter's 60s grade microspheres and Vitro Minerals grade LA7. Such materials can also be used in mixtures with each other, for example from 30:70 to 70:30 by weight.

Graphite or fluorinated polymer particles that may be used in the compositions of the invention typically have a particle size of less than 150 mesh, preferably less than 200 mesh, for example less than 300 mesh. A suitable graphite is 5090 grade graphite obtainable from Superior Graphite Co of Chicago, Ill. A suitable polyfluorinated resin is Teflon®, obtainable from E. I. DuPont de Nemours Inc. of Wilmington, Del.

Compositions according to the invention will typically also contain components to improve their ease of application (in particular the ease with which they can be spread) and adhesion to a substrate (particularly the degree of elasticity they supply to coatings that are subject to temperature variations). A variety of resin products can be used for such purposes. However, I have found that acrylic resins are most suitable for such purposes. Suitable acrylics include Avanse MV 100 and Rhoplex 1791 QS, both of which are available from Dow Chemical and Rayflex 303 and Raycryl 61, both of which are obtainable from Specialty Polymers Inc. of Woodburn, Oreg.

Other components that may be used can include suspension agents, for example cellulosic suspension agents such as hydroxyethylcellulose, antifoam agents such as ByK 024 and Elementis DF 7101 and agents having specialized biocidal properties such as mildewicides or antifouling agents if the coating is to be used in am aqueous environment. Other useful components may include dispersing agents such as W-28, available from Elementis, glycol esters such as Dowanol DNP, available from Dow Chemical, codispersants such as primary amino alcohol co-dispersant, for example AMP-95, available from Angus, ethylene glycol, and aluminum silicate, available from Kish.

If desired, the compositions according to the invention may be used in the form of an aqueous latex. Such a composition would have a water content of from 10% to 60% by weight, preferably 25% to 40% based on the total of the other components of the composition.

The precise composition employed in any situation will depend upon the nature of the substrate, the degree of durability and to some extent on the esthetics required. For example one will seek to minimize the graphite content and have a corresponding increase the glass content (and in particular use glass in the form of hollow spheres) or include a pigment where there is the need for a light colored finish. Excessive use of pigments such as titanium dioxide should, however, be avoided since they can tend to embrittle the coatings.

Compositions according to the invention may be used to coat a variety of substrates including asphalt and concrete infrastucture such as roads and parking lots, steel railroad rolling stock, truck beds, roofs, sea containers, bridges, and storage tanks.

The method used to apply the composition will depend on the nature of the substrate being coated. However, conventional spay and roller methods and troweling may be used as appropriate. When applying the compositions of the invention by use of rollers, I have found plastic textured rollers to be particularly useful.

Although not needed for every application, I have found that coatings of the present composition can be formed in greater thickness than was possible without cracking when using prior compositions. Coatings of this thickness have a variety of applications, for example for use on roofs. Thicker coatings can be formed on parking lots and road surfaces where the substrate is asphalt or concrete.

EXAMPLES

The following are non-limiting examples of compositions according to the invention Example 1

Pourable Caulk

| | |
|---|---|
| Acrylic resin (Avanse MV 100, Dow.) | 250 lbs |
| Acrylic resin (Rhoplex 1791 QS, Dow) | 250 lbs |
| 140 mesh Recycled crumb rubber (Lehigh Technologies) | 250 lbs |
| Defoamer (7010, Elementis) | 5 lbs |
| Dispersing agent (W-28, Elementis) | 5 lbs |
| Glycol ester (Dowanol DNP, Dow) | 10 lbs |
| Primary amino alcohol co-dispersant (AMP-95, Angus) | 10 lbs |
| Ethylene glycol | 12 lbs |
| Zinc oxide (911, Horshead) | 50 lbs |
| Manganese dioxide (Prince) | 75 lbs |
| Aluminum silicate (Kish) | 75 lbs |
| Natrosol MR-250 | 3 lbs |
| Ammonia 28% | 5 lbs |
| Total | 1000 lbs |

The composition was made by mixing the components in the following order: first the acrylic resins were mixed and then the remaining components added in the order set out above. If an aqueous composition is desired, the resins are first added to water and then the remaining components added in the sequence set out.

The composition remains stable for six months and may be applied to any suitable substrate by roller, brush spray or troweling as appropriate Example 2

Primer

| | |
|---|---|
| Acrylic resin (Avanse MV 100, Dow.) | 250 lbs |
| Acrylic resin (Rhoplex 1791 QS, Dow) | 250 lbs |
| 140 mesh Recycled crumb rubber (Lehigh Technologies) | 200 lbs |
| Defoamer (7010, Elementis) | 5 lbs |
| Dispersing agent (W-28, Elementis) | 5 lbs |
| Glycol ester (Dowanol DNP, Dow) | 10 lbs |
| Primary amino alcohol co-dispersant (AMP-95, Angus) | 10 lbs |
| Ethylene glycol | 10 lbs |
| Zinc oxide (911, Horshead) | 50 lbs |
| $Mn_3O_4$ (Prince) | 50 lbs |
| Aluminum silicate (Kish) | 50 lbs |
| Ammonia 28% | 5 lbs |
| Total | 1000 lbs |

The composition is prepared in a similar manner to Example 1.

The composition remains stable for six months and may be applied to any suitable substrate by roller, brush, spray or troweling as appropriate Example 3

| | |
|---|---|
| Acrylic resin (Avanse MV 100, Dow.) | 250 lbs |
| Acrylic resin (Rhoplex 1791 QS, Dow) | 250 lbs |
| 140 mesh Recycled crumb rubber (Lehigh Technologies) | 200 lbs |
| Defoamer (7010, Elementis) | 5 lbs |
| Dispersing agent (W-28, Elementis) | 5 lbs |
| Glycol ester (Dowanol DNP, Dow) | 10 lbs |
| Primary amino alcohol co-dispersant (AMP-95, Angus) | 10 lbs |
| Ethylene glycol | 15 lbs |
| Zinc oxide (911, Horshead) | 50 lbs |
| Cuprous oxide (Clement) | 50 lbs |
| Aluminum silicate (Kish) | 50 lbs |
| Natrosol MR 250 | 100 lbs |
| Water | 100 lbs |
| Total | 1000 lbs |

The composition is prepared in a similar manner to Example 1.

The composition remains stable for six months and may be applied to any suitable substrate using appropriate application equipment including textured rollers, brushes, airless spray guns or toweling with large or small trowels. A panel coated with this composition exposed for three months in the Salton Sea in California exhibited no fouling whereas control panels were heavily fouled with barnacles and other fouling.

Example 4

Electromagnetic Interference Shielding Conductive Rubber

| | |
|---|---|
| Methyl ethyl ketone | 250 lbs |
| Acrylic resin BR-121 (Dianal America) | 250 lbs |
| 200 mesh recycled crumb rubber (Lehigh Technologies) | 200 lbs |
| Zinc oxide 911 (Horsehaed) | 50 lbs |
| Manganese dioxide (prince) | 50 lbs |
| Graphite 5540 (Superior) | 100 lbs |
| Silver-coated hollow spheres (SH 400-520) (Potters) | 90 lbs |
| High surface fumed silica (EH-5) (Cabot) | 10 lbs |
| Total | 1000 lbs. |

The invention claimed is:

1. A coating composition optionally comprising water wherein the composition excluding any water present comprises as percentages by weight a mixture of 10-60% recycled rubber particles, 0-40% glass or plastic particles, 0-10% graphite and/or fluorinated resin, and from 10-50% of a film forming resin, and from 4-10% of a reactive metal oxide.

2. A coating composition as claimed in claim 1, wherein said reactive metal oxide is manganese dioxide, $Mn_3O_4$ or cuprous oxide.

3. A coating composition as claimed in claim 1 which further comprises from 1-10% by weight of zinc oxide.

4. A coating composition as claimed in claim 1, wherein said rubber particles comprise 10-40% by weight of the composition.

5. A coating composition as claimed in claim 1, comprising 10-40% by weight glass or plastic particles.

6. A coating composition as claimed in claim 1, comprising a total of 2-10% by weight at least one of graphite and fluorinated resin.

7. A coating composition as claimed in claim 1, wherein said recycled rubber particles are of a particle size of from 10 to 400 U.S. mesh.

8. A coating composition as claimed in claim 6, wherein said recycled rubber particles comprise particles of a particle size of 10 to 20 U.S. mesh.

9. A coating composition as claimed in claim 1, wherein said recycled rubber particles comprise particles of a size less than 300 U.S. mesh.

10. A coating composition as claimed in claim 1, wherein glass or plastic particles are present and said glass or plastic particles comprise particles that are hollow.

11. A coating composition as claimed in claim 1, which comprises graphite particles.

12. A coating composition as claimed in claim 1, wherein said film-forming resin is an acrylic resin.

13. A coating composition as claimed in claim 1 in the form of an aqueous latex.

14. A coating composition as claimed in claim 1 further comprising silver-coated particles.

\* \* \* \* \*